US007090260B2

(12) United States Patent
Revol

(10) Patent No.: US 7,090,260 B2
(45) Date of Patent: Aug. 15, 2006

(54) COUPLING FOR COMPRESSED GAS PISTON DRIVEN NAILING AND FUEL CARTRIDGE

(75) Inventor: Gerard Revol, Chateaudouble (FR)

(73) Assignee: Societe de Prospection et d'Inventions Techniques SPIT, Bourg-les-Valence (FR)

( * ) Notice: Subject to any disclaimer, the term of this patent is extended or adjusted under 35 U.S.C. 154(b) by 25 days.

(21) Appl. No.: 10/407,948

(22) Filed: Apr. 7, 2003

(65) Prior Publication Data

US 2004/0011844 A1 Jan. 22, 2004

(30) Foreign Application Priority Data

Apr. 8, 2002 (FR) .................................. 02 04347

(51) Int. Cl.
*F16L 21/00* (2006.01)

(52) U.S. Cl. ...................................... 285/369; 285/417

(58) Field of Classification Search ................ 285/369, 285/373, 417, 419
See application file for complete search history.

(56) References Cited

U.S. PATENT DOCUMENTS 3,514,129 A * 5/1970 Holdren .................. 285/140.1
4,619,297 A * 10/1986 Kocher ........................ 141/20
5,962,805 A * 10/1999 Saxby ........................ 102/440
6,217,085 B1 * 4/2001 Toulouse .................... 285/319
6,523,860 B1 * 2/2003 Shkolnikov et al. ........... 285/3

FOREIGN PATENT DOCUMENTS

EP 0 278 873 A1 * 8/1988
FR 2771796 6/1999

* cited by examiner

*Primary Examiner*—James M. Hewitt
(74) *Attorney, Agent, or Firm*—Lowe Hauptman & Berner, LLP

(57) ABSTRACT

A coupling (13) is used for a fuel cartridge (2) outlet nozzle (1) designed to supply a compressed gas mounting device with compressed gas and an intake nozzle (3) on the device's intake system (4). The coupling is a single piece formed to ensure a seal and maintain it between the two nozzles (3,1) of the cartridge (2) and the intake system (4).

10 Claims, 3 Drawing Sheets

COUPLING FOR COMPRESSED GAS PISTON DRIVEN NAILING AND FUEL CARTRIDGE

BACKGROUND OF THE INVENTION

A compressed gas driven piston nailing or plug-mounting device with a compressed gas supply in the form of a fuel cartridge containing the liquid-state compressed gas in an inner casing. In addition to the fuel the cartridge contains, between the inner and outer casing, a propellant to keep the fuel in a liquid state. A male outlet nozzle is connected to the inner casing and projects through the outer casing.

At each firing, a specific dose of compressed gas is injected from the fuel cartridge into a combustion chamber in the mounting device, said quantity being correctly determined only if the compressed gas is in a liquid state.

To determine the quantity of compressed gas injected into the combustion chamber, mounting devices often include a solenoid valve with a compressed gas intake nozzle.

Known intake systems, such as that described in FR 2 771 796, use a male intake nozzle, inside a socket formed by a peripheral protective skirt. This intake nozzle is designed to cooperate with an outlet valve on the cartridge, removing the valve from its seat to allow the gas to be transferred from the cartridge into the device's intake system. During the transfer operation, leaks must be prevented around the cartridge valve and the device's intake nozzle. To this end, often, and in particular in the case of the cartridge described in FR 2 771 796, the cartridge's outlet valve extends into a male nozzle, which cooperates with the device's male intake nozzle inside an appropriately outfitted coupling.

The coupling contains a gasket extending along both sides of the mating surfaces of both male nozzles and is held inside an adaptor covering inserted into the mounting device's solenoid valve protective socket as well as a protective socket on the compressed gas cartridge.

SUMMARY OF THE INVENTION

This invention attempts to overcome this multiplicity of components.

To this end, the invention covers a coupling for a compressed gas mounting device fuel cartridge outlet nozzle and an intake nozzle in the device's gas intake system, designed to prevent leaks between the two nozzles and the means to prevent leaks between the cartridge and the intake system, said coupling consisting of a single piece and shaped to prevent leaks between the cartridge and the intake system.

The sealing and holding coupling may include a tubular sealing and holding adaptor around the two nozzles, which may be extended by a ring shaped holding base.

The adaptor's inner wall may be shaped to form a seal between the two nozzles by their lateral walls, with the possibility of an internal recess for containing any leaked gas.

The sealing adaptor may also be equipped to provide a seal between the two nozzles with ring-shaped surfaces against the cartridge's and the intake system's transverse shoulders.

In this case, the adapter may be a smooth adaptor or a bellows-shaped adaptor.

The adapter may also seal the ends with o-rings placed in the adapter's recesses.

In another implementation, the coupling is formed to be force mounted between the cartridge and the intake system, with the means for sealing and counter-coupling placed in the cartridge to maintain the seal.

BRIEF DESCRIPTION OF THE DRAWINGS

The invention will be better understood with the following description of several coupling implementations, referencing the attached drawing, on which.

DETAILED DESCRIPTION OF THE PREFERRED EMBODIMENTS

Figure 1:
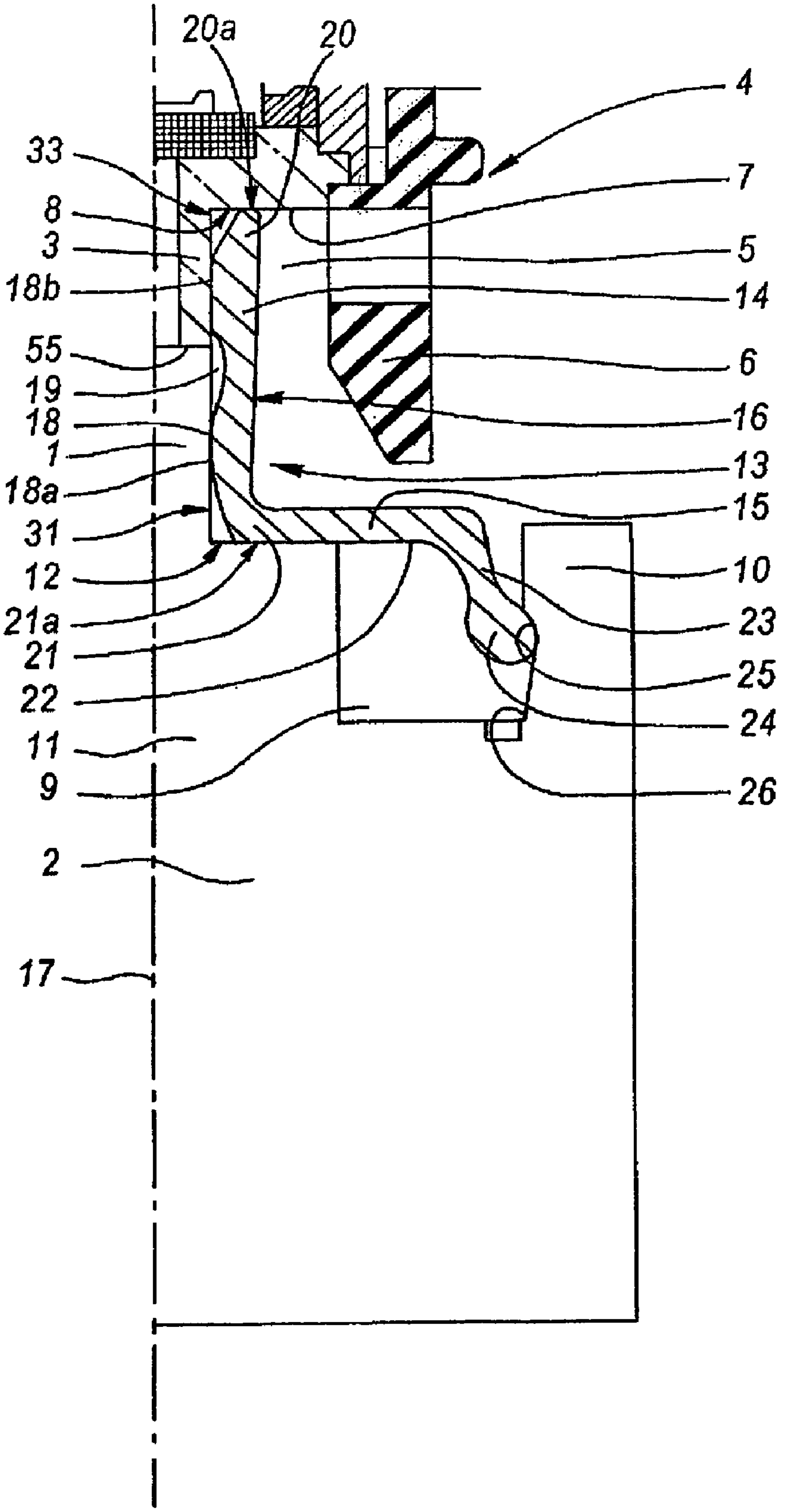
FIG. 1 is a half-cutaway drawing of a first implementation of the coupling.

Referencing FIG. 1, the invention coupling, in all its various implementations in all the attached figures, is designed to connect outlet nozzle 1 on liquid-state compressed gas cartridge 2 and intake nozzle 3 on solenoid valve 4 for gas intake on a compressed gas mounting device. Both nozzles are male.

Intake nozzle 3 extends inside socket 5 formed by peripheral skirt 6 of solenoid valve 4.

Base 7 of socket 5 defines a ring-shaped "transverse" shoulder 8.

Outlet nozzle 1 extends outside socket 9 formed by peripheral skirt 10 on cartridge 2 and extends upwardly from central contact stud 11 which forms a ring-shaped "transverse" shoulder 12.

Coupling 13, providing a seal between nozzles 1 and 3, is a single piece. Its shape allows it to fulfill its sealing function and its holding function between cartridge 2 and solenoid valve 4.

Coupling 13 is made up of tubular sealing and holding adaptor or tubular section 14 and ring-shaped holding base section 15.

Adapter 14 has a straight cylindrical outer lateral surface 16, on the same axis 17 as the solenoid valve and the cartridge. Adapter 14 further has an irregular inner lateral surface 18, forming an internal recess 19 for holding leaked gas. Adapter 14 further has two ends 20, 21 respectively defining end surfaces 20*a*, 21*a* of adaptor 14. Holding recess 19 is located between sections 18*a*, 18*b* of inner lateral surface 18 and extends on both sides of the mating surface 55 of both nozzles. When the nozzles are placed end to end, a seal is provided by outer lateral (vertical as shown in FIG. 1) walls 31, 33 of the nozzles and sections 18*a*, 18*b* of inner lateral surface 18 (figure). A seal is also provided between end surfaces 20*a*, 21*a* of adaptor 14 and the transverse shoulders 8, 12, respectively.

Coupling 13 is thus held between shoulders 8 and 12 by ends 20 and 21 of adaptor 14.

More particularly, the pressures which are exerted (a) by sections 18*a*, 18*b* of the adapter 14 on either side of recess 19 against outer lateral walls 31, 33 of the two nozzles, (b) by end surfaces 20*a*, 21*a* at the ends 20, 21 of adaptor 14 against shoulders 8 and 12, and (c) by holding base section 15 against central contract stud 11 and skirt 10, hold coupling 13 in operating position between the solenoid valve and the cartridge. Holding base section 15 includes central disk 22. Disk 22 is orthogonal to axis 17, extended by peripheral skirt 23, noticeably cylindrical, along axis 17, and ends in flange 24 placed, with light force, in recess 25 located on the inner wall 26 of skirt 10 of the cartridge.

The invention coupling implementations in FIGS. 2–5 are designed for the same solenoid valve—cartridge set as for FIG. 1, therefore it is unnecessary to describe these two elements again or reference them on the figures, except for those that are necessary for describing the structure and operation of the coupling implementations.

Figure 2:
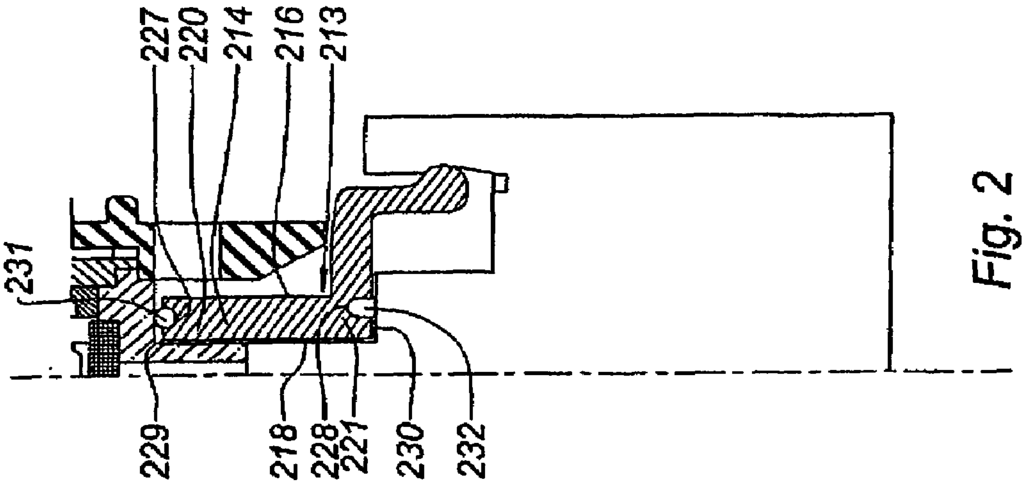
FIG. 2 is a half-cutaway drawing of a second implementation of the coupling.

Coupling 213 in FIG. 2 is largely similar to that in FIG. 1. It is differentiated by inner lateral wall 218 on adapter 214 which is a straight cylinder, as is outer wall 216, and by adapter 214's edges 220 and 221, which are not ground-down but have recesses 227, 228 placed in their transverse ring-shaped surfaces 229, 230 for o-rings 231, 232 designed to press against shoulders 8 and 12. With coupling 213, the seal is provided by the ring-shaped surfaces on ends 229 and 230.

Figure 3:
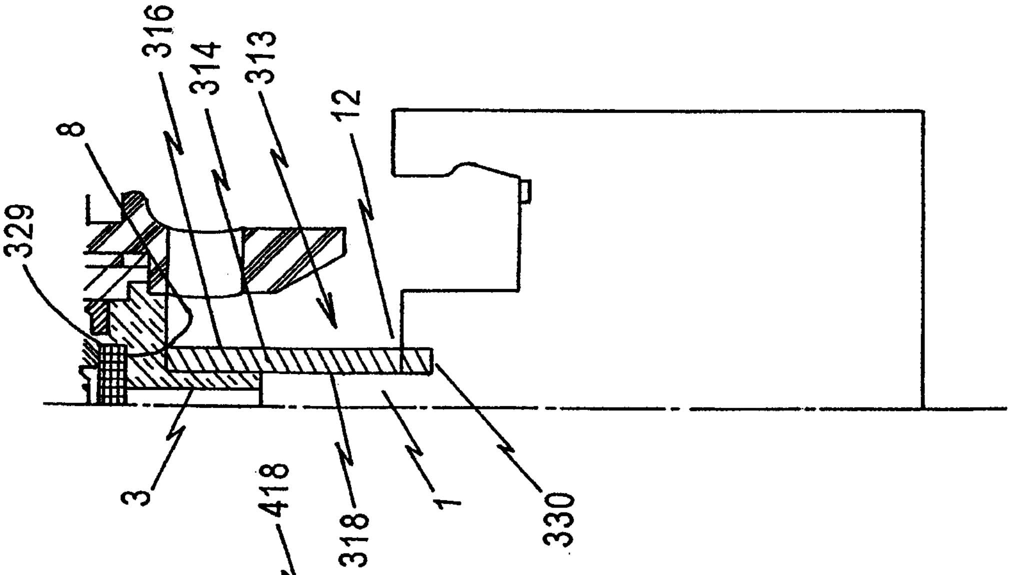
FIG. 3 is a half-cutaway drawing of a third implementation of the coupling.

Coupling 313 in FIG. 3 is distinguished by the fact that it includes only a tubular sealing adaptor 314, which is smooth, with inner 318 and outer 316 lateral surfaces composed of straight cylinders, without a holding base. Adapter 314 extends around both nozzles 1 and 3 where it is laterally pressed and the two annular surfaces 329, 330 press against shoulders 8, 12 slightly compressed along the axis. Ring-shaped surfaces 329 and 330 and inner lateral surface 318 provide the seal. Adapter compression is created by the fact that its length at rest is slightly greater than the distance between the free ring-shaped surface of central contact stud 11 on the cartridge, around nozzle 1, and solenoid valve 4 socket 5 base 7.

Figure 4:
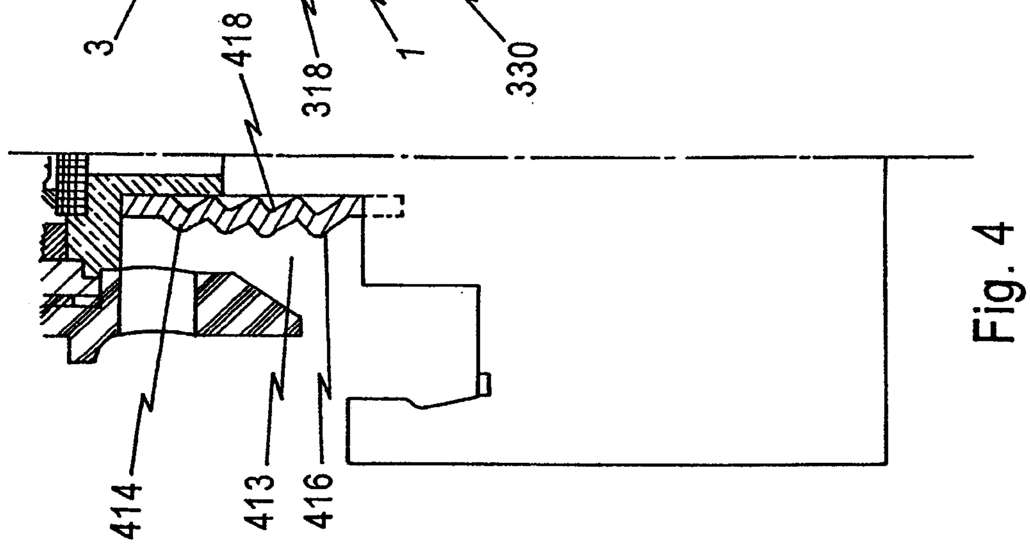

Coupling 413 in FIG. 4 is highly similar to that of FIG. 3. It is only distinguished by the structure of the adaptor 414 having inner 418 and outer 416 lateral walls, which are not smooth but bellows-shaped.

Figure 5:
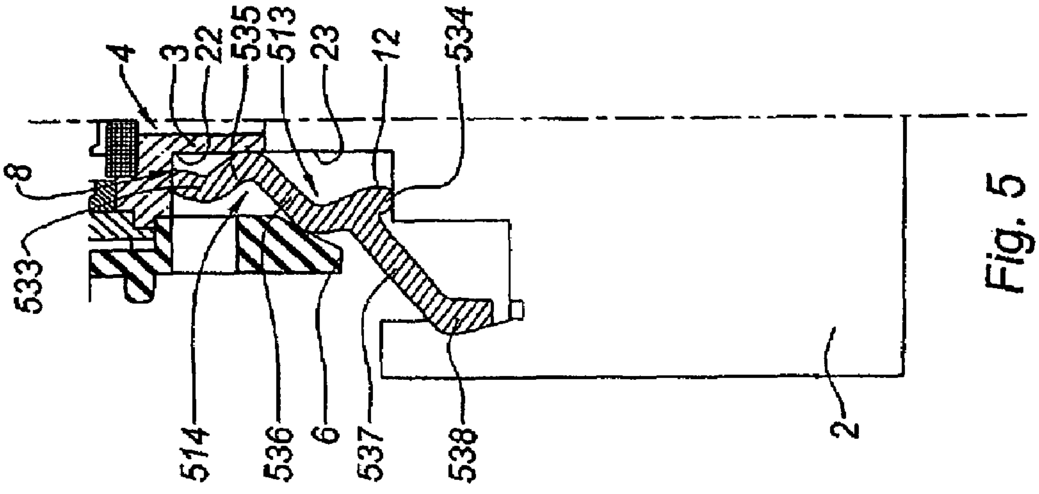
FIG. 4 is a half-cutaway drawing of a fourth implementation of the coupling and FIG. 5 is a half-cutaway drawing of a fifth implementation of the coupling.

Coupling 523 in FIG. 5 includes an undulated sealing and holding adapter 514 with a first edge 533 pressing against shoulder 8 and solenoid valve 4 and, a second opposite edge 534, against shoulder 12 and cartridge 2. With an inner rib 535, close to edge 533, the adapter presses against the intake nozzle 3 and, with an outer rib 536, close to edge 534, it presses against the peripheral skirt 6 of the solenoid valve 4. In this example, truncated holding skirt 537 extends from an area close to edge 534 between outer rib 536 and edge 534 and ends with curved shoulder 538 forced into recess 25 in cartridge 2's skirt 10's inner wall. Skirt 537 creates the means of counter pressure, which in recess 9 on the cartridge maintains the seal created by adapter 514.

What is claimed is:

1. A coupling for an outlet nozzle of a compressed gas cartridge adapted to supply compressed gas to a device that runs on compressed gas and an inlet nozzle of a gas intake system of the device, said coupling being a single piece shaped to be retainable between the cartridge and the intake system and to seal the outlet and inlet nozzles;

wherein said single piece includes a tubular section for sealing and surrounding the two nozzles, said tubular section having opposite ends adapted to contact, in a sealing manner, the cartridge and the intake system in regions outside the outlet and inlet nozzles, respectively.

2. The coupling according to claim 1, wherein said single piece further includes a ring shaped holding base section contiguous to one of said opposite ends of said tubular section, said holding base section being adapted to contact, in a sealing manner, the cartridge in the region outside the outlet nozzle.

3. The coupling according to claim 2, wherein the holding base section includes a peripheral skirt ending in a flange.

4. The coupling according to claim 1, wherein the tubular section has an irregular inner surface having at least one sealing area which is adapted to contact, in a sealing manner, one of the outlet and inlet nozzles and an internal recess for retaining leaked gas.

5. The coupling according to claim 4, wherein the at least one sealing area and opposite ends of the tubular section are configured so that the coupling is retainable in an operating position thereof between the regions of the cartridge and the intake system which regions are outside the outlet and inlet nozzles, respectively.

6. A connection, comprising:

a male outlet nozzle of a compressed gas cartridge;

a male inlet nozzle of a gas intake system of a device that runs on compressed gas supplied by said cartridge; and a coupling being a single piece retained between the cartridge and the intake system to seal the outlet and inlet nozzles;

wherein said single piece includes a tubular section sealing and surrounding the two nozzles, said tubular section having opposite ends which contact, in a sealing manner, the cartridge and the intake system in regions outside the outlet and inlet nozzles, respectively.

7. The connection according to claim 6, wherein said single piece further includes a ring shaped holding base section contiguous to one of said opposite ends of said tubular section, and wherein said holding base section contacts, in a sealing manner, the cartridge in the region outside the outlet nozzle.

8. The connection according to claim 7, wherein the holding base section includes a peripheral skirt ending in a flange received in a recess located in an inner wall of a peripheral skirt of the cartridge, said peripheral skirt of the cartridge surrounding the outlet nozzle.

9. The connection according to claim 6, wherein the tubular section has an irregular inner surface having at least one sealing area which sealingly contacts one of the outlet and inlet nozzles and an internal recess for retaining leaked gas.

10. The connection according to claim 6, wherein said single piece further includes a ring shaped holding base section contiguous to one of said opposite ends of said tubular section;

the holding base section includes a peripheral skirt ending in a flange received in a recess located in an inner wall of a peripheral skirt of the cartridge, said peripheral skirt of the cartridge surrounding the outlet nozzle; and said intake system further includes a peripheral skirt surrounding completely the inlet nozzle and at least partially the outlet nozzle, said peripheral skirt of said intake system being spaced from said holding base section in an axial direction of said inlet and outlet nozzles.

* * * * *